(12) United States Patent
Manaev

(10) Patent No.: US 7,774,147 B1
(45) Date of Patent: Aug. 10, 2010

(54) SYSTEMS AND METHODS FOR DETECTING AND ADDRESSING DATA FLAWS IN SOFTWARE ARTIFACTS

(75) Inventor: Dmitri Manaev, Parramatta (AU)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 11/617,539

(22) Filed: Dec. 28, 2006

(51) Int. Cl.
  *G01B 7/34* (2006.01)
(52) U.S. Cl. .................. 702/35; 702/38; 702/179; 702/183
(58) Field of Classification Search ................ 702/106, 702/123, 179, 181, 183, 185; 709/250; 711/202; 714/704, 737, 718; 356/237
  See application file for complete search history.

(56) References Cited

U.S. PATENT DOCUMENTS

| | | | | |
|---|---|---|---|---|
| 4,428,672 A | * | 1/1984 | Allard et al. ............. | 356/237.2 |
| 4,448,680 A | * | 5/1984 | Wilks et al. .................. | 209/564 |
| 4,852,100 A | * | 7/1989 | Christensen et al. ........ | 714/763 |
| 5,220,567 A | * | 6/1993 | Dooley et al. ............... | 714/704 |
| 5,343,559 A | * | 8/1994 | Lee ............................. | 711/202 |

\* cited by examiner

*Primary Examiner*—Hal D Wachsman
*Assistant Examiner*—Felix E Suarez
(74) *Attorney, Agent, or Firm*—Advantedge Law Group

(57) ABSTRACT

Systems and methods are provided for upgrading a software artifact having accumulated data flaws. The software artifact may be accessible, for example, by a plurality of software components for backend services. Issues that cause the data flaws and corresponding fixes are tracked and evaluated to determine dependencies, if any, between the fixes. The fixes are applied to the software artifact as individual transactions. If there are no dependencies among a subset of fixes, the fixes in the subset are applied regardless of whether the other fixes in the subset were successfully applied. For subsets having dependencies between fixes, the fixes that depend from a prior unsuccessfully applied fix are discarded. The software artifact is rolled back to remove unsuccessfully applied fixes.

25 Claims, 3 Drawing Sheets

SYSTEMS AND METHODS FOR DETECTING AND ADDRESSING DATA FLAWS IN SOFTWARE ARTIFACTS

TECHNICAL FIELD

This disclosure relates generally to upgrading software. More particularly, this disclosure relates to analyzing and repairing accumulated data flaws in complex software artifacts so as to provide an upgraded version of the software artifacts.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
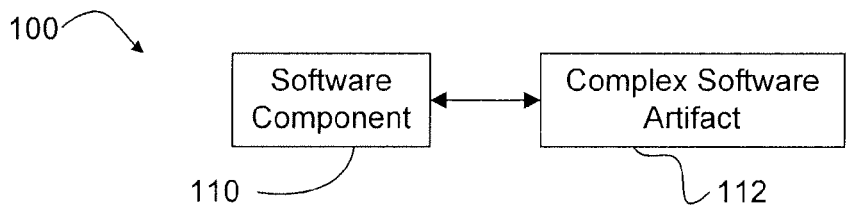
FIG. 1 is a simplified block diagram of a software product having a software component that interacts with a complex software artifact according to one embodiment.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Embodiments may include various steps, which may be embodied in machine-executable instructions to be executed by a general-purpose or special-purpose processor (or other electronic device). Alternatively, the steps may be performed by hardware components that include specific logic for performing the steps or by a combination of hardware, software, and/or firmware.

Embodiments may also be provided as a computer program product including a machine-readable storage medium having stored thereon instructions that may be used to program a computer (or other electronic device) to perform processes described herein. The machine-readable storage medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

FIG. 1 is a simplified block diagram of a software product 100 having a software component 110 that interacts with a complex software artifact 112. In one embodiment, the software component 110 provides client or front end services and the complex software artifact 112 provides server or back end services.

Over sufficiently long periods of time, the complex software artifact 112 may have a tendency to accumulate irregularities and data flaws that prevent future versions of the complex software artifacts 112 and/or future versions of the software component 110 from functioning correctly. Thus, when the software product 100 is upgraded, data collected during the life of the software complex artifact 112 may need to be discarded to remove the accumulated irregularities or data flaws.

However, it is often desirable to retain the data collected during the life of the software complex artifact 112. Such data may include, for example, configuration settings, audit data, completed job results, and/or other user-specific data. Thus, as discussed in detail below, certain embodiments analyze and repair (fix) detected data flaws to provide increased or maximized reuse of the data collected during the life of the complex software artifact 112.

Figure 2:
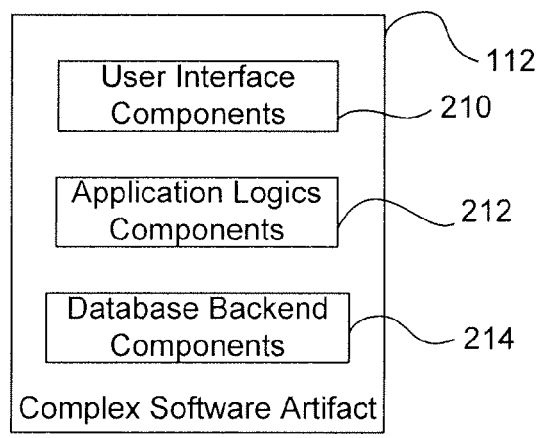
FIG. 2 is a block diagram of an example complex software artifact according to one embodiment.

FIG. 2 is a block diagram of an example complex software artifact 112 according to one embodiment. The example complex software artifact 112 includes user interface components 210, application logics components 212, and database back-end components 214. As discussed below, the complex software artifact 112 may be accessible to a plurality of software components 110. Thus, for example, the user interface components 210 may include interface settings or schemes commonly used by the software components 110. As another example, the application logics components 212 may provide application delivery and/or execution for the plurality of software components 110.

The database backend components 214 include the accumulated data collected during the life of the complex software artifact 112. The accumulated data may be stored in tables or other defined data structures. The user interface components 210, application logics components 212, and/or one or more software components 110 may access the accumulated data stored in the database backend components 214. Incompatible access by the various components may cause flaws in the accumulated data. Further, the flaws in the accumulated data may cause errors in the user interface components 210, application logics components 212, and/or one or more software components 110.

Figure 3:
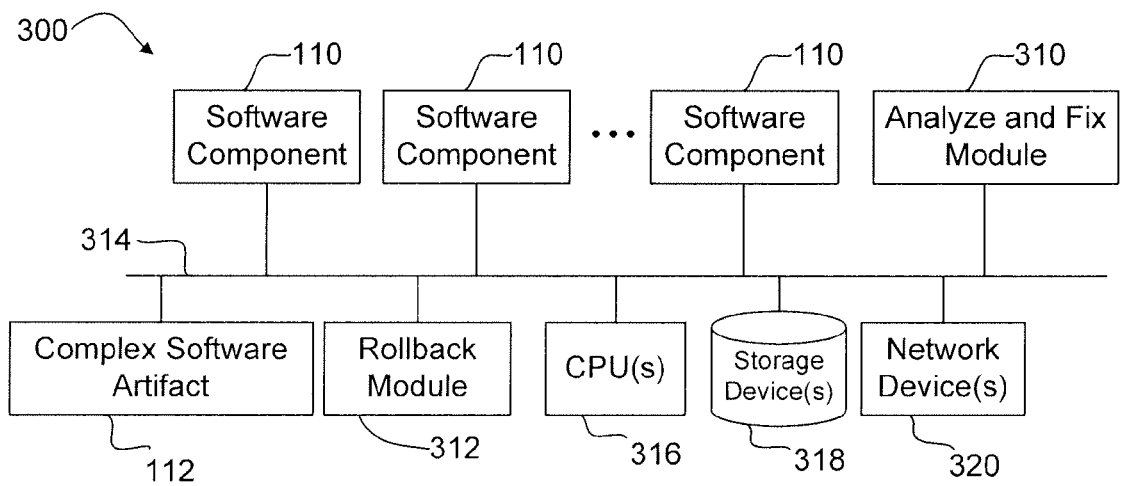
FIG. 3 is a block diagram of a system configured to analyze and fix data flaws in a complex software artifact accessed by a plurality of software components according to one embodiment.

FIG. 3 is a block diagram of a system 300 configured to analyze and fix data flaws in a complex software artifact 112 accessed by a plurality of software components 110 (three shown) according to one embodiment. The plurality of software components 110 access (e.g., read/write) a common set of accumulated data stored in the complex software artifact 112. Thus, changes or additions to the accumulated data made by one of the software components 110 may inadvertently cause errors when the changes or additions are later accessed by another software component 110.

The system 300 includes an analyze and fix module 310 that evaluates a group of detected data flaws in the complex software artifact 112, devises a strategy for addressing the group of flaws, and applies fixes to the complex software artifact 112 as individual transactions. If a fix or group of dependent fixes fails, the system 300 applies a rollback module 312 that restores the database backend components 214 to a previous state.

In one embodiment, the system 300 is distributed on a network 314 that includes one or more central processor units 316 (CPUs 316), storage devices 318, and/or other network devices 320. The illustrated system elements may be implemented using any suitable combination of hardware, software, and/or firmware. The CPUs 316 may be embodied as microprocessor, microcontrollers, digital signal processors, or other devices known in the art. The CPUs 316 may perform logical and arithmetic operations based on program code and data stored within, for example, the storage devices 318.

The storage devices 318 may include, for example, hard disk drives, optical storage devices, solid state storage devices, or other storage devices for storing software programs for performing the processes disclosed herein and associated data. The other network devices 320 may include, for example, an integrated services digital network (ISDN), a wireless network card, an asymmetric digital subscriber line (ADSL) adapter, and other types of network devices.

One of ordinary skill in the art having the benefit of this disclosure will recognize that two or more of the system elements shown in FIG. 3 may be combined. For example, the complex software artifact 112, the rollback module 312, the analyze and fix module 310, a CPU 316, and/or a storage device 318 may be part of a single backend server (not shown).

Figure 4:
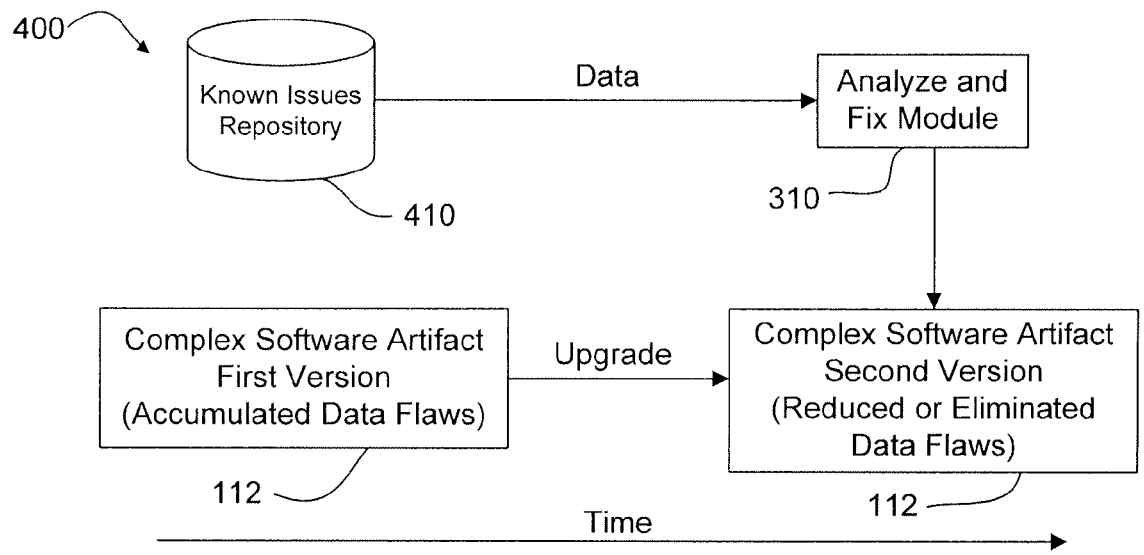
FIG. 4 is a block diagram graphically illustrating a process for upgrading a complex software artifact having accumulated data flaws according to one embodiment.

FIG. 4 is a block diagram graphically illustrating a process 400 for upgrading a complex software artifact 112 having accumulated data flaws according to one embodiment. Prior to a release of a second version of the complex software artifact 112, a list of issues that are known to cause flaws in the data in the database backend components 214 of a first version of the complex software artifact 112 are collected and stored in a known issues repository 410. The issues causing the data flaws may be detected, for example, by system users such as testers or customers. The known issues repository 410 also includes a list of fixes that addresses the flaws. Generally, known issue repositories 410 are used by software developers to track version upgrades.

The analyze and fix module 310 is configured to evaluate the first version of the complex software artifact 112 in the presence of the known flaws, devise a strategy for addressing the known flaws, and apply the fixes as individual transactions.

One of ordinary skill in the art having the benefit of this disclosure will recognize that all or a subset of the fixes addressing the known flaws may be dependent on one another. For example, applying certain fixes may cause additional failures or may cause other fixes to be ineffective. As another example, a particular fix may only be effective if one or more other fixes have also been applied.

Figure 5A:
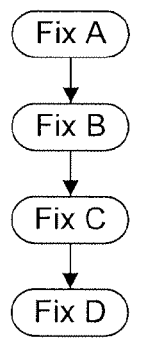
FIG. 5A is a flow chart of a method for applying a plurality of independent fixes according to one embodiment.

Thus, in one embodiment, groups or subsets of fixes are applied differently depending on whether or not the subset includes fixes that are dependent on one another. For example, FIG. 5A is a flow chart of a method for applying a plurality of independent fixes (Fix A-Fix D) according to one embodiment. Because there are no dependencies between Fix A-Fix D, (e.g., Fix B does not depend on Fix A), the fixes are sequentially applied and the respective outcomes reported. In one embodiment, each fix is applied, regardless of whether or not the previous fix was successfully applied.

Figure 5B:
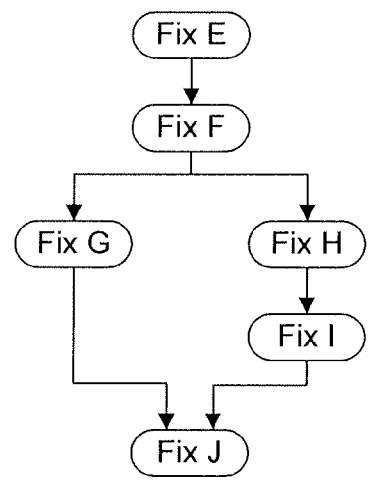
FIG. 5B is a flow chart of a method for applying a plurality of fixes having at least one dependency according to an example embodiment.

If, however, there is a dependency between fixes, dependent fixes are only applied if a fix from which they depend is successfully applied. For example, FIG. 5B is a flow chart of a method for applying a plurality of fixes (Fix E-Fix J) having at least one dependency according to an example embodiment. In this example, Fixes G and H are each dependent on the success of Fix F. Further, Fix I is dependent on the success of Fix H, and Fix J is dependent on the success of Fix G and Fix I. Thus, if Fix F is not successfully applied, none of the remaining fixes in the sequence are applied. If, however, only Fix I fails, then Fix J is not applied (Fix E-Fix H are applied).

Returning to FIGS. 3 and 4, after the analyze and fix module 310 applies a particular fix, the system 300 is tested to determine whether the particular fix passes (corrects an intended data flaw) or fails (does not correct the intended data flaw and/or causes additional data flaws). If the particular fix fails, the rollback module 312 is applied to restore the database backend components 214 of the complex software artifact 112 to its state immediately before applying the particular fix. Thus, the rollback module 312 ensures that the analyze and fix module 310 does not jeopardize the data integrity of the complex software artifact 112.

In one embodiment, the fixes are assigned a priority level. The priority level of a failed fix is compared to a threshold priority level to determine whether or not to continue with the upgrade. For example, a user may determine that a particular fix has a "critical" priority level such that it is important to the integrity of the system 300 or highly desired by the user. If the critical fix fails, the upgrade is aborted until a new fix for the intended data flaw is derived. As another example, if a particular fix having an "average" priority fails, the analyze and fix module 310 may determine to continue with the upgrade without applying the particular fix.

As shown in FIG. 4, after the accumulated data flaws in the first version of the complex software artifact 112 have been reduced or eliminated, the second version of the complex software artifact 112 is deployed or uploaded. The above process 400 decouples the detection of the data flaws from their respective fixes by evaluating the flaws in combination rather than individually. Fixing a single flaw without consideration of the other flaws may prevent the analyze and fix module 310 from detecting additional flaws and/or may make the fix of other flaws difficult or impossible. In one embodiment, all of the detected flaws are evaluated as one unit before strategies for their fixing are devised and executed. This increases or maximizes the probability of data reuse in upgraded complex software artifacts 112.

In one embodiment, the complex software artifact 112 shown in FIG. 3 is implemented in a unified backend server with long data retaining expectancy and is coupled with a large number of software components 110. For such an embodiment, the disclosure herein provides a unified strategy for data retention during system upgrade.

Figure 6:
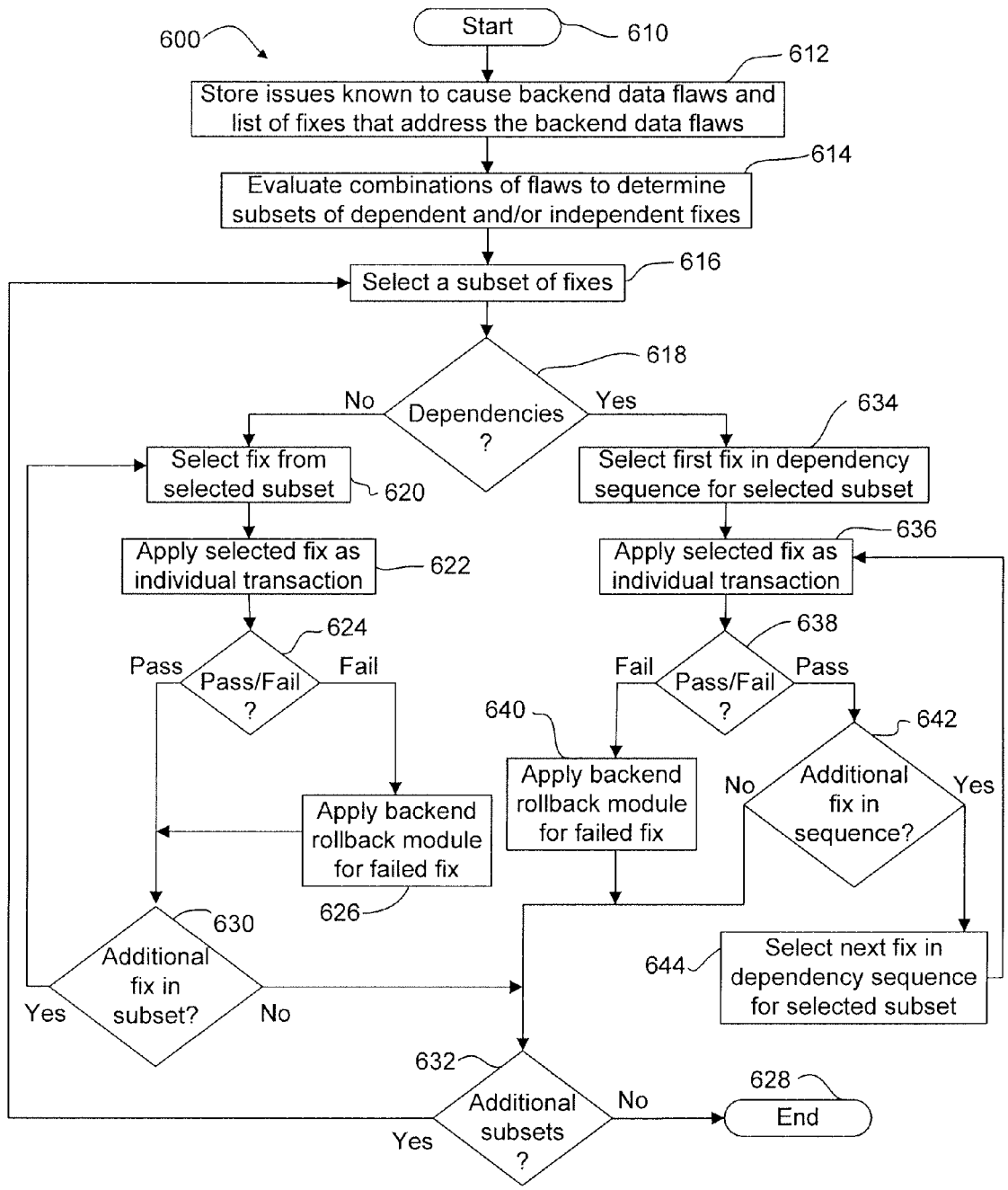
FIG. 6 is a flowchart of a method for handling data flaws in software artifacts according to one embodiment.

FIG. 6 is a flowchart of a method 600 for handling data flaws in software artifacts according to one embodiment. After starting 610, the method 600 includes storing 612 issues known to cause backend data flaws and a list of fixes that address the backend data flaws. The method 600 then evaluates 614 combinations of flaws to determine subsets of dependent and/or independent fixes. In one embodiment, fixes that do not have dependencies are placed in a first subset and fixes with dependencies are placed in respective second subsets according to their dependency relationships.

The method 600 then selects 616 a subset of fixes and queries 618 whether the selected subset includes dependencies. If the selected subset does not include dependencies, the method 600 selects 620 a particular fix from the selected subset and applies 622 the selected fix as an individual transaction to the backend data flaws. The method 600 then determines 624 whether the selected fix passed or failed. If the selected fix failed, the method 600 applies 626 a backend rollback module for the failed fix to restore the backend data to a previous known state before the application of the selected fix. Although not shown, in one embodiment, the selected fix is assigned a priority such that critical failures cause the method 600 to end 628 after applying 626 the backend rollback module.

If the failure is non-critical, or if the selected fix passes, the method 600 queries 630 whether additional fixes are in the selected subset. If so, the method 600 selects 620 another fix from the subset for processing. If there are no additional fixes in the subset, the method queries 632 whether there are any additional subsets. If so, the method 600 selects 616 another subset for processing. If there are no additional subsets to process, the method 600 ends 628.

If the selected subset includes dependencies, the method selects 634 a first fix in a dependency sequence for the selected subset and applies 636 the selected fix as an individual transaction. The method 600 then queries 638 whether the selected fix passed or failed. If the selected fix failed, the method 600 applies the backend rollback module for the failed fix. Again, in one embodiment, the selected fix is assigned a priority such that critical failures cause (not shown) the method 600 to end 628 after applying 640 the backend rollback module. If the selected fix is non-critical, the method 600 again queries 632 whether there are any additional subsets.

If the selected fix passed, the method 600 queries whether there is an additional fix in the dependency sequence for the selected subset. If there is an additional fix in the sequence, the method selects 644 the next fix in the dependency sequence for the selected subset and again applies 636 the selected fix as an individual transaction. If there is not an additional fix in the sequence, the method 600 again queries 632 whether there are any additional subsets.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A computer-implemented method for upgrading software artifacts having accumulated data flaws, the method comprising:
    determining a set of fixes that attempts to correct accumulated data flaws in a software artifact;
    evaluating combinations of the data flaws to determine dependencies between the fixes in the set;
    placing the fixes in respective subsets according to their dependency relationships; and
    applying a first fix from a first subset to the software artifact, the first fix intended to correct a first data flaw in the software artifact;
    wherein at least a portion of the method is performed by a computing device comprising at least one processor.

2. The method of claim 1, further comprising applying a second fix from the first subset to the software artifact, the second fix intended to correct a second data flaw in the software artifact, the second fix being applied independent of the first fix.

3. The method of claim 1, further comprising determining whether the first fix passed or failed.

4. The method of claim 3, wherein the first fix fails by at least one of:
    failing to correct the first data flaw; and
    causing a second data flaw in the software artifact.

5. The method of claim 3, further comprising, if the first fix passed, applying a second fix from the first subset to the software artifact, the second fix intended to correct a second data flaw in the software artifact, the second fix being dependent on the first fix.

6. The method of claim 3, further comprising, if the first fix failed, aborting sequential application of one or more second fixes from the first subset, the one or more second fixes being dependent on the first fix.

7. The method of claim 3, further comprising, if the first fix failed, rolling back the software artifact to a previous state to reverse the application of the first fix.

8. The method of claim 3, further comprising:
    setting a threshold priority level;
    assigning a priority level to the first fix; and
    if the first fix failed, and if the priority level assigned to the first fix equals or exceeds the threshold priority level, canceling the upgrade of the software artifact.

9. The method of claim 1, further comprising:
    applying a second fix from the first subset to the software artifact, the second fix intended to correct a second data flaw in the software artifact; and
    applying a third fix from a second subset to the software artifact, the third fix intended to correct a third data flaw in the software artifact.

10. The method of claim 9, wherein the second fix is dependent on the first fix.

11. The method of claim 10, wherein the second subset is dependent on the first subset.

12. A system for reusing data after a software upgrade, the system comprising:

a database for storing issues causing data flaws that are accumulated in a software artifact accessible by a plurality of software components and a list of corresponding fixes for the data flaws in the software artifact; and an analyze and fix module configured to:
  evaluate combinations of the data flaws to determine dependencies between the fixes;
  place the fixes in respective subsets according to their dependency relationships; and
  apply a first fix from a first subset to the software artifact, the first fix intended to correct a first data flaw in the software artifact;

at least one processor configured to execute the analyze and fix module.

13. The system of claim 12, wherein the software artifact comprises database backend components that store the software components.

14. The system of claim 13, wherein the software artifact further comprises:
  user interface components; and
  application logics components.

15. The system of claim 12, wherein at least one of the data flaws are caused by inconsistent access to the software artifact by at least one of the software components.

16. The system of claim 12, wherein the analyze and fix module is further configured to apply a second fix from the first subset to the software artifact, the second fix intended to correct a second data flaw in the software artifact, the analyze and fix module applying the second fix independent of the first fix.

17. The system of claim 12, wherein the analyze and fix module is further configured to apply, if the first fix passed, a second fix from the first subset to the software artifact, the second fix intended to correct a second data flaw in the software artifact, the second fix being dependent on the first fix.

18. The system of claim 12, wherein the analyze and fix module is further configured to, if the first fix failed, abort sequential application of one or more second fixes from the first subset, the one or more second fixes being dependent on the first fix.

19. The system of claim 12, further comprising a rollback module configured to, if the first fix failed, reverse the application of the first fix to the software artifact.

20. The system of claim 12, wherein the analyze and fix module is further configured to:
  set a threshold priority level;
  assign a priority level to the first fix; and
  if the first fix failed, and if the priority level assigned to the first fix equals or exceeds the threshold priority level, cancel the upgrade of the software artifact.

21. A system for upgrading software artifacts having accumulated data flaws, the system comprising:
  a storage module programmed to track issues that cause accumulated data flaws in a software artifact and corresponding fixes for the data flaws in the software artifact; and
  a repair module programmed to:
    evaluate the data flaws to determine a sequence of dependent fixes from the fixes in the storage module;
    sequentially process the dependent fixes as individual transactions, wherein fixes in the sequence that depend from successfully applied prior fixes are applied to the software artifact, and wherein fixes in the sequence that depend from unsuccessfully applied prior fixes are discarded;
  at least one processor configured to execute the storage module and the repair module.

22. The system of claim 21, wherein unsuccessfully applied prior fixes fail to correct a targeted data flaw in the software artifact.

23. The system of claim 21, wherein unsuccessfully applied prior fixes cause additional data flaws in the software artifact.

24. The system of claim 21, further comprising a rollback module programmed to remove the unsuccessfully applied prior fixes from the software artifact.

25. A non-transitory computer accessible storage medium including program instructions that, when executed by at least one processor of a computing device, cause the computing device to:
  determine a set of fixes that attempts to correct accumulated data flaws in a software artifact;
  evaluate combinations of the data flaws to determine dependencies between the fixes in the set;
  place the fixes in respective subsets according to their dependency relationships; and
  apply a first fix from a first subset to the software artifact, the first fix intended to correct a first data flaw in the software artifact.

* * * * *